US012724141B1

(12) United States Patent
Johnson et al.

(10) Patent No.: US 12,724,141 B1
(45) Date of Patent: Sep. 1, 2026

(54) INTELLIGENT, ADAPTIVE, ELECTRONIC COUNTERMEASURE GENERATION SYSTEM

(71) Applicant: SPAWAR Systems Center Pacific, San Diego, CA (US)

(72) Inventors: Nicholas T. Johnson, San Diego, CA (US); John D. Reeder, San Diego, CA (US); Michael P. Civerolo, San Diego, CA (US); Christopher L. Lichtenberg, Carlsbad, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 2792 days.

(21) Appl. No.: 15/731,588

(22) Filed: Jun. 28, 2017

Related U.S. Application Data

(60) Provisional application No. 62/364,668, filed on Jul. 20, 2016.

(51) Int. Cl.
*G01S 7/02* (2006.01)
*G01S 7/36* (2006.01)
(Continued)

(52) U.S. Cl.
CPC ................ *G01S 13/78* (2013.01); *G01S 7/36* (2013.01); *G01S 13/75* (2013.01); *G01S 13/767* (2013.01);
(Continued)

(58) Field of Classification Search
CPC ....... G01S 7/021; G01S 7/38; H04K 2203/16; H04K 2203/18; H04K 2203/22; H04K 3/45; H04K 3/825; H04K 3/827; H04K 3/94
See application file for complete search history.

(56) References Cited

U.S. PATENT DOCUMENTS

| | | | | |
|---|---|---|---|---|
| 7,242,346 B1 | 7/2007 | Slutzky et al. | | |
| 2008/0111728 A1* | 5/2008 | Stevens | G01S 7/38 342/14 | |

(Continued)

OTHER PUBLICATIONS

James Townsend et al.; Waveform Optimization for Electronic Countermeasure Technique Generation; IEEE, 2008.

*Primary Examiner* — Timothy A Brainard
(74) *Attorney, Agent, or Firm* — Naval Information Warfare Center Pacific; Kyle Eppele; J. Eric Anderson

(57) ABSTRACT

A method for generating countermeasure techniques to radar signals comprising the following steps; storing parameters of known radar signals and a corresponding, pre-programmed countermeasure technique for each known radar signal in a data library; training a machine learning model to make statistical correlations between the known radar signal parameters and the countermeasure techniques stored in the data library; receiving a radar signal that has parameters that do not exactly match any of the known radar signals in the data library; producing a new countermeasure technique for the received radar signal based on the received signal's parameters and the statistical correlations; passing the new countermeasure technique to an adaptive digital signal processing (DSP) algorithm to optimize the new countermeasure technique based on a real-time stream of signal data; and storing the received radar signal and the new, optimized countermeasure technique in the data library.

12 Claims, 8 Drawing Sheets

(51) Int. Cl.
*G01S 13/75* (2006.01)
*G01S 13/76* (2006.01)
*G01S 13/78* (2006.01)
*H04K 3/00* (2006.01)

(52) U.S. Cl.
CPC ................ *H04K 3/45* (2013.01); *G01S 7/021* (2013.01); *H04K 3/65* (2013.01); *H04K 2203/10* (2013.01); *H04K 2203/34* (2013.01)

(56) References Cited

U.S. PATENT DOCUMENTS

2014/0159934 A1* 6/2014 Rudnisky ................. H04K 3/00
342/14
2017/0160379 A1* 6/2017 Markel ..................... G01S 7/38

* cited by examiner

Pulse Descriptor Word

| Parameter | Resolution | Measurement Area | Number of Bits |
|---|---|---|---|
| Amplitude | 1 dB | 60 dB | 6 |
| Frequency | 1 MHz | 2-18 GHz | 14 |
| Pulse Width | 50 ns | 100 µs | 11 |
| Time of Arrival | 0.1 µs | 1.7 s | 24 |
| Angle of Arrival | 0.7° | 360° | 9 |
| | | Size of Pulse Descriptor | 64 |

INTELLIGENT, ADAPTIVE, ELECTRONIC COUNTERMEASURE GENERATION SYSTEM

CROSS-REFERENCE TO RELATED APPLICATION

This application claims the benefit of U.S. Provisional Application No. 62/364,668, filed 20 Jul. 2016, titled "Intelligent, Adaptive, Electronic Countermeasure Generation System" (Navy Case #103719).

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, CA, 92152; voice (619) 553-5118; ssc_pac_t2@navy.mil. Reference Navy Case Number 103719.

BACKGROUND OF THE INVENTION

Radars are used in both military and commercial applications to determine if there are objects within range of the radar, how large those objects are, where those objects are, what those objects are, and how those objects are moving. It is desired in some applications to deceive, deny, or degrade a radar's ability to sense objects. By using specially engineered radio frequency (RF) signals tailored to a radar, an electronic warfare (EW) system can perform these functions. The process of generating EA and electronic countermeasure (ECM) techniques requires interception and collection of a radar signal, analysis by specialized engineers and technicians, testing, distribution to appropriate operational personnel, and finally a software upgrade to each individual EW system. The system architecture of a prior art EW system is shown in FIG. 1. Even if an enemy radar signal is collected, analyzed, and an EW countermeasure technique is designed, that same threat radar may exhibit different RF signal characteristics during wartime. There is a need for a better method to deceive, deny, or degrade a radar's ability to sense objects.

SUMMARY

Disclosed herein is a method for generating countermeasure techniques to radar signals comprising the following steps. The first step provides for storing parameters of known radar signals and a corresponding, pre-programmed countermeasure technique for each known radar signal in a data library. The next step provides for training a machine learning model to make statistical correlations between the known radar signal parameters and the countermeasure techniques stored in the data library. The next step provides for receiving a radar signal that has parameters that do not exactly match any of the known radar signals in the data library. The next step provides for producing a new countermeasure technique for the received radar signal based on the received signal's parameters and the statistical correlations. The next step provides for passing the new countermeasure technique to an adaptive digital signal processing (DSP) algorithm to optimize the new countermeasure technique based on a real-time stream of signal data. The next step provides for storing the received radar signal and the new, optimized countermeasure technique in the data library.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
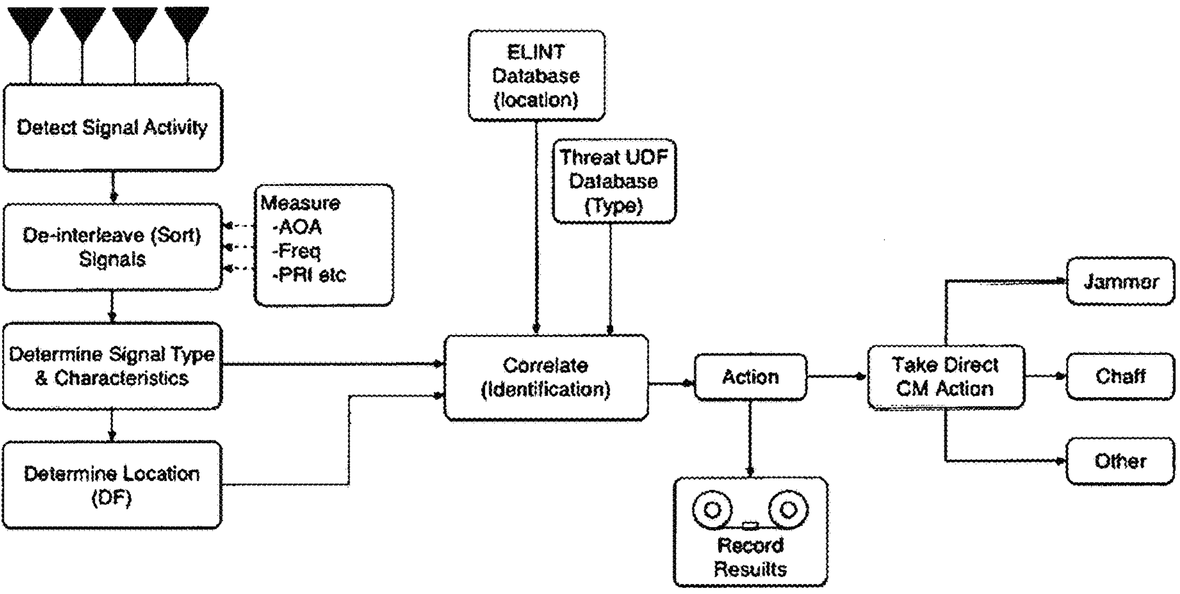
FIG. 1 is an illustration of the system architecture of a prior art electronic warfare system.
Figure 2:
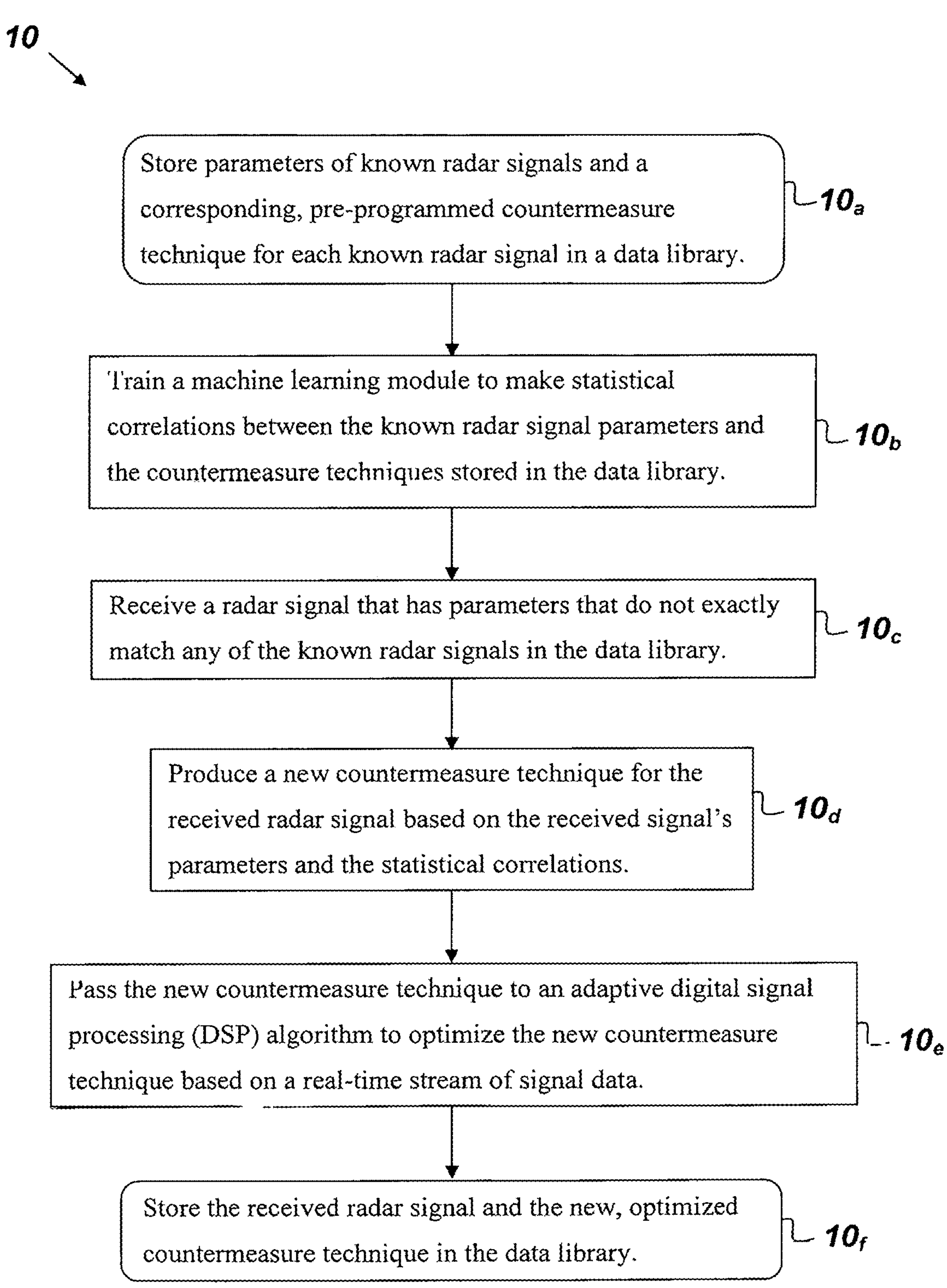
FIG. 2 is a flowchart of a countermeasure generation method.

FIG. 2 is a flowchart of a method 10 for generating countermeasure techniques to radar signals. Method 10 comprises, consists of, or consists essentially of the following steps. The first step $\mathbf{10}_a$ provides for storing parameters of known radar signals and a corresponding, pre-programmed countermeasure technique for each known radar signal in a data library. The next step $\mathbf{10}_b$ provides for training a machine learning model to make statistical correlations between the known radar signal parameters and the countermeasure techniques stored in the data library. The next step $\mathbf{10}_c$ provides for receiving a radar signal that has parameters that do not exactly match any of the known radar signals in the data library. The next step $\mathbf{10}_d$ provides for producing a new countermeasure technique for the received radar signal based on the received signal's parameters and the statistical correlations. The next step $\mathbf{10}_e$ provides for passing the new countermeasure technique to an adaptive digital signal processing (DSP) algorithm to optimize the new countermeasure technique based on a real-time stream of signal data. The next step $\mathbf{10}_f$ provides for storing the received radar signal and the new, optimized countermeasure technique in the data library. The new, optimized countermeasure techniques may be used to deny or degrade a radar's ability to detect and track targets and allows for EA/ECM technique generation in real-time without prior knowledge of the received radar signal.

Figure 3:
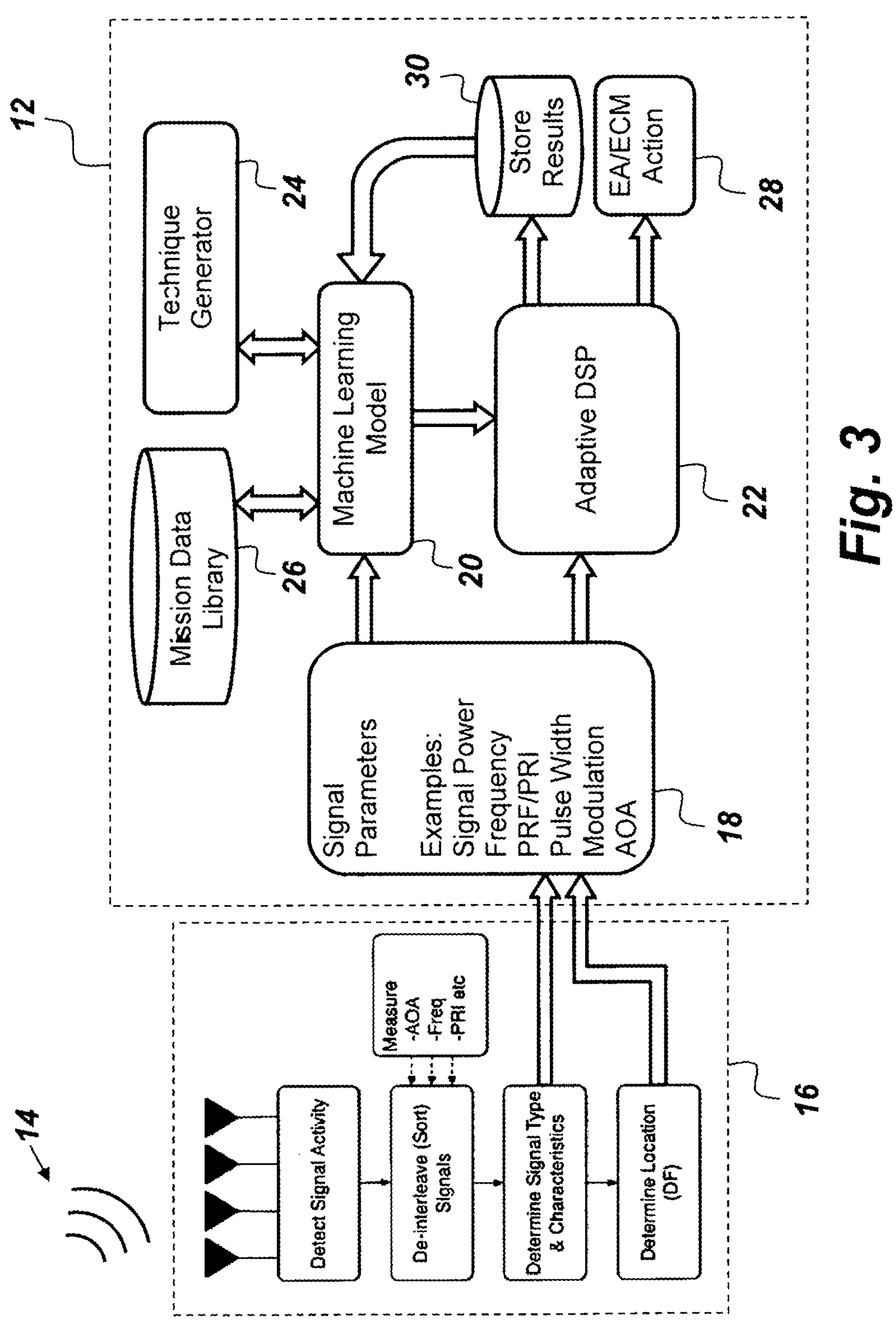
FIG. 3 is a block diagram of an intelligent, adaptive electronic warfare (IAEW) system.

FIG. 3 is a block diagram of an intelligent, adaptive electronic warfare (IAEW) system 12 that may be used for implementing countermeasure technique generation method

10. As shown in FIG. 3, a radar signal 14 is received by a receiver system 16, which may be any receiver system capable of receiving the radar signal 14 and identifying signal parameters. The signal parameters 18 of the radar signal 14 are transmitted to a machine learning model 20 and an adaptive DSP system 22. The signal parameters 18 that may be used by method 10 include, but are not limited to, signal power, frequency, pulse repetition interval (PRI), pulse repetition frequency (PRF), pulse width, modulation, and angle of arrival (AoA). The machine learning model 20 is the cognitive engine of the IAEW system 12. The machine learning model 20 may be a model developed using classification techniques to make statistical correlations between electronic intelligence (ELINT) data and legacy EA/ECM techniques that have been developed in the past. This allows the "trained" machine learning model 20 and a technique generator 24 to generalize an EA/ECM technique when presented with radar signal data such as the signal parameters 18. In other words, the countermeasure technique generation method 10 can generalize effective ECM techniques against radar signals based on learned responses from previous mission data sets. Proven data sets may be used to train the machine learning model 20, which maps signal parameters to effective countermeasure techniques. The machine learning model 20 is then able to map previously unknown signal parameters to techniques that are effective against radars with similar signal characteristics. When the trained machine learning model 20 is presented with signal parameters 18, it first scans the legacy lookup table (depicted in FIG. 3 as the Mission Data Library 26) for a stored radar signal with exactly matching signal parameters. If no match exists, the machine learning model 20 and the technique generator 24 can produce a new EA/ECM technique for the received radar signal 14 based on the signal parameters 18.

Still in reference to FIG. 3, once a new technique has been produced, it is then passed to the adaptive DSP system 22 where an adaptive DSP algorithm may be run that optimizes the new technique based on a real-time stream of signal data. This adaptive DSP system 22 makes the necessary calculations to generate an efficient, believable response to fool a radar's automated logic or system operator. The results of the adaptive DSP algorithm may then be used in an EA/ECM action 28 and/or stored in a memory store 30 for use by a classification system of the machine learning model 20. This allows for continuous learning of the machine learning model 20. The intelligent, adaptive electronic warfare system 12 and countermeasure technique generation method 10 produces accurate, effective EA/ECM techniques in real-time without the use of standard lookup tables and without requiring pre-programmed ELINT datasets used by legacy EW systems. It is also able to "learn" from previous engagement, updating its cognitive engine in real-time.

The machine learning model 20 may be any machine learning classification model. Examples of suitable machine learning classification models include, but are not limited to, neural networks, support vector machine, and random forests. Method 10 may be employed by any electronic warfare system. For example, any airborne or surface EW system engaging a threat radar could potentially incorporate this system. This would give the capability to generate a new EA/ECM technique against unknown radar signal signals. The countermeasure technique generation method 10 may be used to counter emerging radar threats to Navy ships and assets by employing intelligent algorithms within legacy and developmental electronic warfare systems without relying solely on pre-programmed mission data to identify and defeat threatening radar systems.

Radar systems that were previously treated as "ambiguous" or "unknown" by prior electronic warfare systems may actually turn out to be new systems, new modes of existing radar systems, or with small changes to the RF parameters of the prior systems. The countermeasure technique generation method 10 avoids the "unknown" issue by learning to map received radio frequency parameters to electronic countermeasure techniques of similar, known threats. Once a new technique is generated, it may be constantly evaluated and modified with the adaptive DSP system 22. During simulated EW scenarios, the countermeasure technique generation method 10 has generated appropriate ECM techniques against unknown radar signals with a 98 percent degree of accuracy. This has been demonstrated for both airborne and surface ship applications where the countermeasure technique generation method 10 was used to provide adaptive EA and ECM against simulated radar threats generally used to guide kinetic weapons at platforms.

Figure 4A:
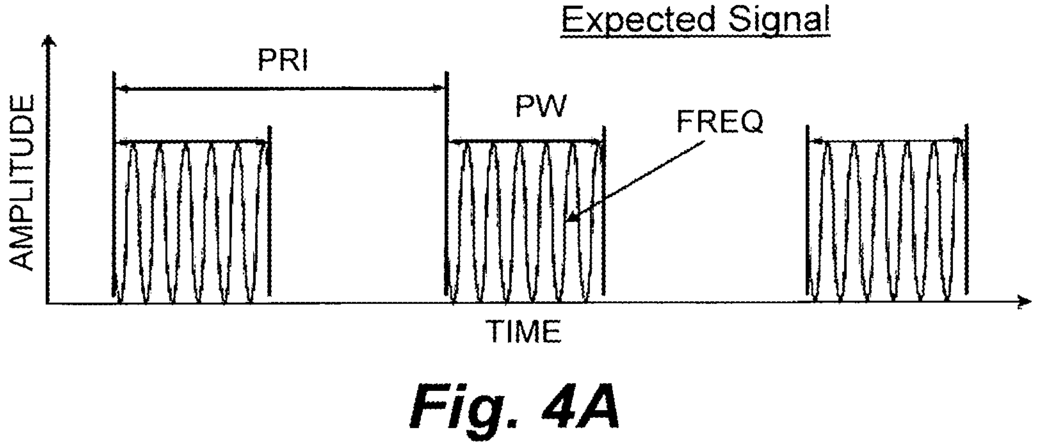
FIGS. 4A and 4B 4A are plots of radar signals.
Figure 4B:
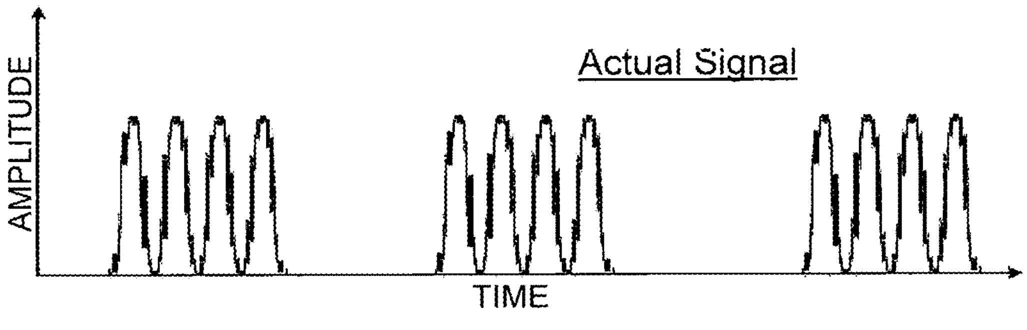

FIG. 4A is a plot of an example radar signal that one would expect to receive in theater. The example radar signal may be stored in the mission data library 26, which serves as an ELINT database. Prior to storing in the mission data library 26, the radar signal is first collected, characterized, and programmed into a mission data set. Then, if the expected radar signal is seen in theater, in its expected form, an EW system may react accordingly. FIG. 4B is a plot of an example radar signal that might actually be received in theater. As can be seen in comparing FIGS. 4A and 4B, there is a slight frequency variation between the two plots, but the amplitude, and the PRI are the same. The countermeasure technique generation method 10 is able to generate and optimize a new EA/ECM technique in response to the actual received signal by evaluating the parameters of the received radar signal and generalizing an EA/ECM response based on those parameters and statistical correlations between the mission data sets and the countermeasure techniques stored in the mission data library 26.

Figure 5:
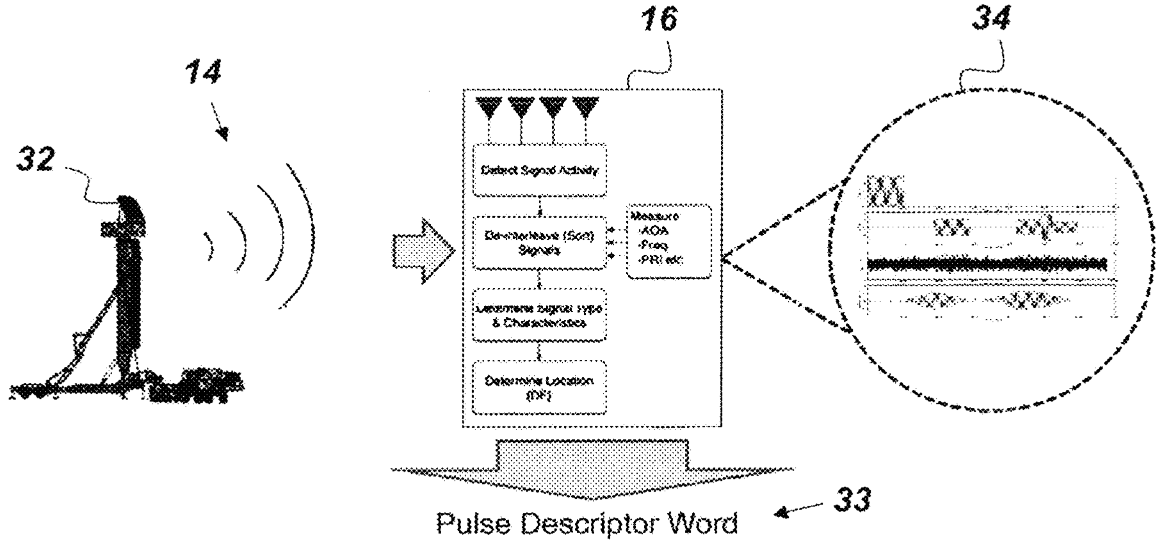
FIG. 5 is an illustration depicting an example of parameters of a radar signal being converted into a pulse descriptor word.

FIG. 5 is an illustration depicting an example of how parameters of the radar signal 14, which is generated by a source 32 and received by the receiver system 16, may be converted into a pulse descriptor word 33 that comprises a machine-readable representation of the parameters of the received radar signal 14. Break out circle 34 is an illustration of plots representing the received radar signal 14 as measured by the receiver system 16. In this example embodiment, the pulse descriptor word comprises data representing the amplitude, the frequency, the pulse width, the time of arrival (ToA), and the angle of arrival (AoA) of the received radar signal 14.

Figure 6:
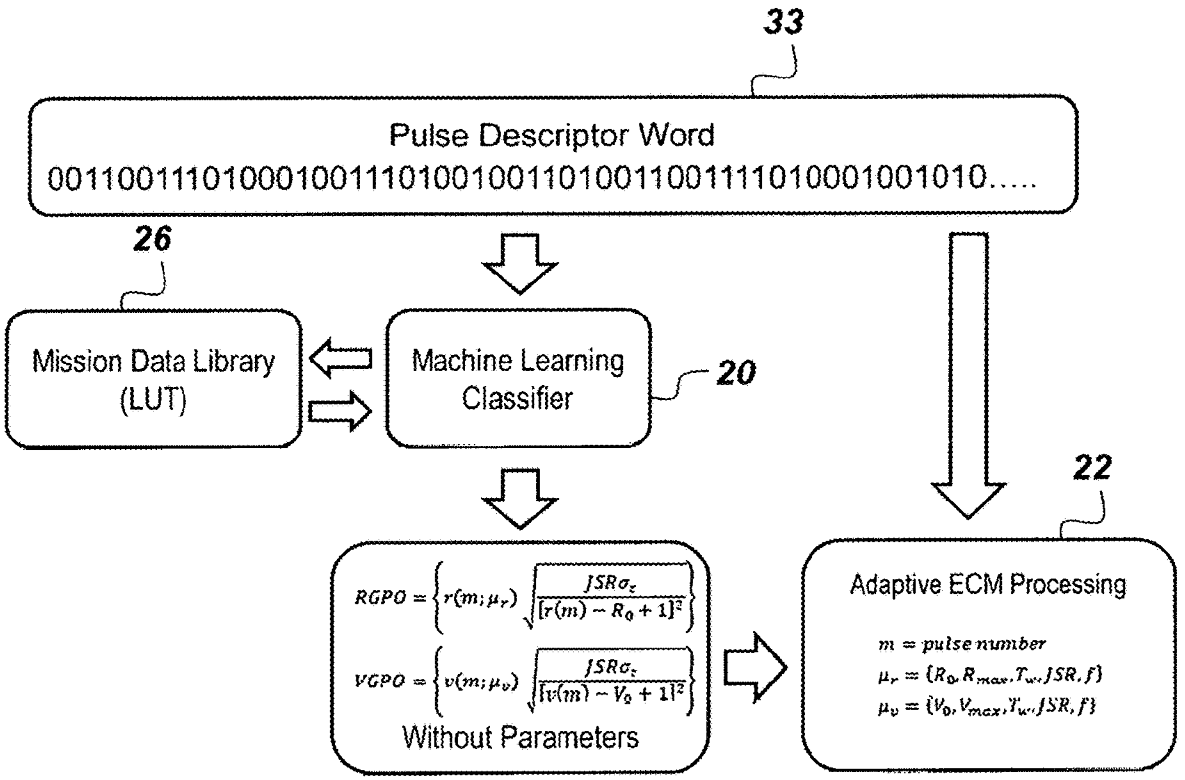
FIG. 6 is a flowchart showing how a pulse descriptor word being forwarded to a machine learning model and an adaptive DSP system.

FIG. 6 is a flowchart showing how the pulse descriptor word 33 may be forwarded to the machine learning model 20 and the adaptive DSP system 22 for processing. The machine learning model 20 compares the parameters in the pulse descriptor word 33 with the information stored in the mission data library 26, which in this embodiment is a look-up table (LUT), and then classifies the received radar signal 14. In this example embodiment, the machine learning model 20 has recommended two ECM techniques: a range gate pull off (RGPO) and a velocity gate pull off (VGPO). The RGPO may be characterized as follows:

$$RGPO = \left\{ r(m; \mu_r) \sqrt{\frac{JSR\sigma_t}{[r(m) - R_0 + 1]^2}} \right\} \tag{1}$$

where m is the pulse number, r is the range of the pulse number, $JSR\sigma_t$ is the jamming to signal ratio of the radar cross section of the source 32, $\mu_r=\{R_0, R_{max}, T_w, JSR, f\}$, f is a polynomial factor, $R_0$ is an initial range delay, $R_{max}$ is a maximum range delay and $T_w$ is a walk-off time. The VGPO may be characterized as follows:

$$VGPO = \left\{ v(m;\mu_v)\sqrt{\frac{JSR\sigma_t}{[v(m)-V_0+1]^2}} \right\} \quad (2)$$

where $\mu_v=\{V_0, V_{max}, T_w, JSR, f\}$, $V_0$ is an initial velocity, and $V_{max}$ is a maximum velocity.

Further details regarding RGPO and VGPO may be found in the article by James Townsend et al. "Waveform optimization for electronic countermeasure technique generation", which is incorporated herein by reference in its entirety. Still referring to the example scenario depicted in FIG. 6, the machine learning model passes the ECM techniques to the adaptive DSP system 22. The adaptive DSP system 22 then inserts the parameters of the received radar signal 14 into the RGPO and VGPO techniques.

Figure 7:
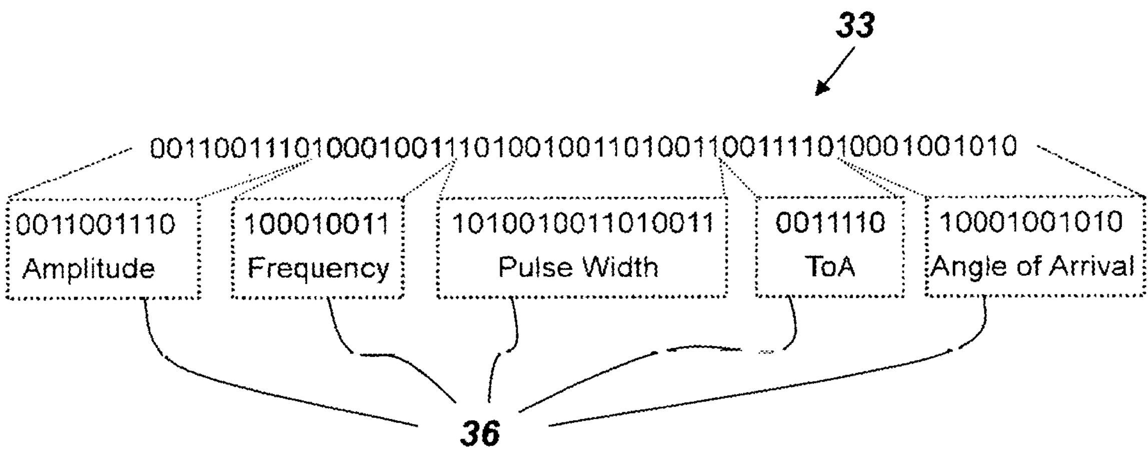
FIG. 7 is an illustration of a pulse descriptor word.

FIG. 7 is a representation of an example pulse descriptor word 33. Every radar signal may be represented by a corresponding pulse descriptor word 33. In order to train the machine learning model 20, a data library of known radar threats may be converted into training and testing data sets. For example, 80% of the library of known radar threats may be identified as the training set and the remaining 20% may be used as the testing data set. Every pulse descriptor word 33 may be split into features 36, where each feature 36 represents a signal parameter of the corresponding radar signal. Input values of the pulse descriptor words may then be normalized and ECM techniques clustered into classes.

Figure 8A:
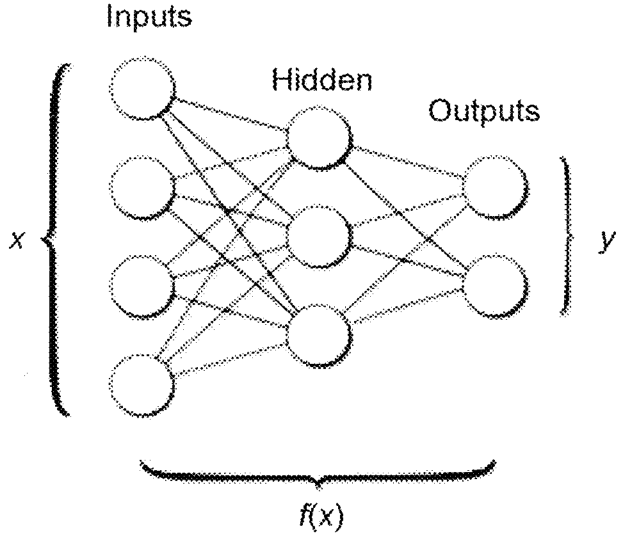
FIG. 8A is an illustration of a multi-layer graph structure of a neural network.

FIG. 8A is an illustration of a multi-layer graph structure of a neural network, which in an example embodiment, may be used as the machine learning model 20. A neural network can learn to represent any function and serves as a good generalization to unseen examples. In a neural network, each node integrates input signals using a sigmoid activation function such as, but not limited to:

$$\tanh(x),\ \text{erf}\left(\frac{\sqrt{\pi}}{2}x\right),\ \frac{2}{\pi}gd\left(\frac{\pi}{2}x\right),\ \frac{x}{\sqrt{1+x^2}},\ \frac{2}{\pi}\arctan\left(\frac{\pi}{2}x\right),\text{ and }\frac{x}{1+|x|}.$$

A neural network may be trained by optimizing network weights to minimize a cost function mean squared error $$(MSE) := \frac{1}{n}\sum_{i=n}^{n}(\hat{Y}_i - Y_i)^2,$$

where $\hat{Y}$ is a vector of n predictions and Y is a vector of observed values corresponding to the inputs to the functions that generated the predictions.

Support vector machines are another example embodiment of the machine learning model 20. Training with support vector machines may be accomplished by solving a min/max algorithm using quadratic programming. With support vector machines, one can use kernel methods to solve non-linear problems such as:

$$\underset{w,b}{\text{argmin}}\ \max_{\alpha\geq 0}\left\{\frac{1}{2}\|w\|^2 - \sum_{i=1}^{n}\alpha_i\,[y_i(w\cdot x_i - b) - 1]\right\} \quad (3)$$

where $x_i$ and $y_i$ are example inputs and w is a corresponding weight, b is the hyperplane offset from the origin, and $\alpha$ is a vector of slack variables that facilitate the soft-margin.

Figure 8B:
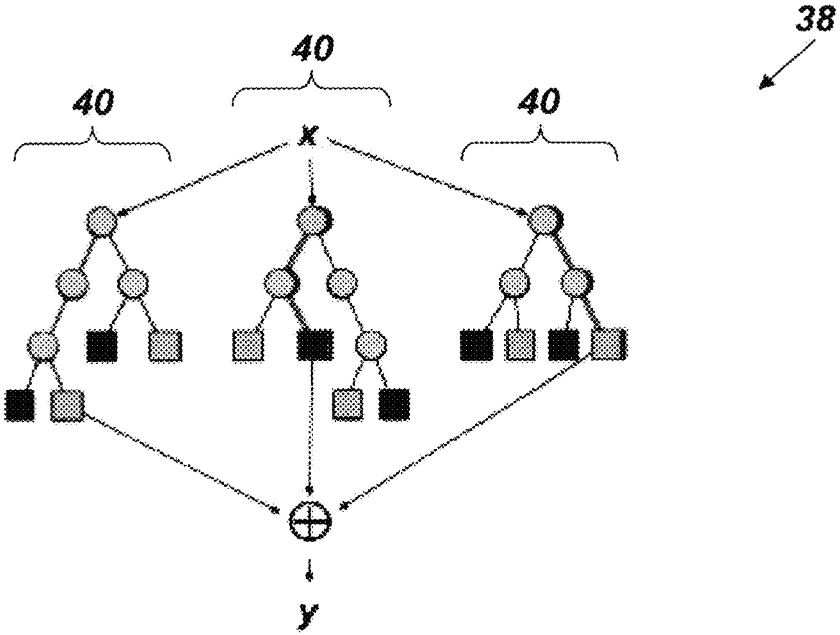
FIG. 8B is an illustration of an ensemble classifier.

Another example embodiment of the machine learning model 20 is a random forest ensemble classifier. FIG. 8B is an illustration of an ensemble classifier 38 comprising three decision trees 40 that may be used in an ensemble classifier. In general, a random forest ensemble classifier is a technique that uses a collection of decision trees. Each decision tree may be trained on a subset of the training data and a subset of input features. An ensemble classifier may be used to find the relative importance of a given input feature. Decision trees may be constructed by choosing the best split at each level using a measure of information gain or impurity. Each tree is polled and the classification is chosen as the mean or mode of the individual outputs. Classification may be performed by voting or averaging the output of each tree according to the following equation:

$$\hat{f} = \frac{1}{B}\sum_{b=1}^{B}\hat{f}_b(x') \quad (4)$$

The mission data library 26 comprises a given training set of known radar threats $X=x_1, \ldots, x_n$ with known ECM responses $Y=y_1, \ldots, y_n$. Bootstrap aggregating, or bagging, repeatedly (B times) selects a random sample with replacement of the training set and fits trees to these samples. For $b=1, \ldots, B$: (1) Sample, with replacement, B training examples from X, Y—call these $X_b$, $Y_b$; and (2) Train a decision or regression tree $f_b$ on $X_b$, $Y_b$. Equation 5 below represents the Gini impurity. It is one of several options available for determining how much information gain there will be given a particular decision point in the decision tree. The Gini impurity calculates how often a randomly chosen example from a class would be incorrectly labeled if labels were assigned based on the distribution of the subset. Equation 6 is another measure of information gain that can be used in random forests. It represents a concept of entropy from information theory.

$$I_G(f) = 1 - \sum_{i=1}^{m} f_i^2 \quad (5)$$

$$I_E(f) = \sum_{i=1}^{m} f_i \log_2 f_i \quad (6)$$

The machine learning model 20 may take as input the signal parameters from a radar front end. These parameters include, but are not limited to, pulse width, pulse duration, and frequency. The machine learning model 20 maps the signal parameters to EA techniques that have been programmed in the mission data library 26. The machine learning model 20 generalizes the information in the mission data library 26 and provides a suggested technique for signal parameters even when they are not matched perfectly to the mission data library 26. A model is generated by training the machine learning model 20 on a training set developed from the mission data library 26. The training set is created by combining data from the mission data library 26 with emitter parameter data from an emitter database. The training set defines the expertly designed techniques as they are matched to specific emitters and the signal parameters for those emitters. The machine learning model 20 may be trained on a subset of this data and validated on a hold out subset. The training continues until the validation steps indicate training as stopped improving. The machine learning model 20 parameters are tuned to provide the highest classification accuracy. The training process may be completed offline on a full mission data library 26. The model is then transferred to a signal processing pipeline. When an unknown emitter is detected the signal parameters are sent to the machine learning model 20 which will provide a suggested technique template from the available EA responses. This template is then passed to the adaptive DSP for implementation.

The countermeasure technique generation method 10 is able to counter dynamic threat RF, to generate multiple waveforms simultaneously, and to counter previously unknown/emerging agile radar threats. From the above description of the countermeasure technique generation method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method for generating countermeasure techniques to radar signals comprising the following steps:
- storing parameters of known radar signals and a corresponding, pre-programmed countermeasure technique for each known radar signal in a data library;
- training a machine learning model to make statistical correlations between the known radar signal parameters and the countermeasure techniques stored in the data library;
- receiving a radar signal that has parameters that do not exactly match any of the known radar signals in the data library;
- producing a new countermeasure technique for the received radar signal based on the received signal's parameters and the statistical correlations;
- passing the new countermeasure technique to an adaptive digital signal processing (DSP) algorithm to optimize the new countermeasure technique based on a real-time stream of signal data; and
- storing the received radar signal and the new, optimized countermeasure technique in the data library.

2. The method of claim 1, wherein the machine learning model passes a shell of a new technique to the adaptive DSP algorithm where the shell is populated with parameters from the received radar signal.

3. The method of claim 1, wherein the parameters are selected from the group consisting of: angle of arrival, time of arrival, amplitude, frequency, pulse width, and pulse repetition interval.

4. The method of claim 1, wherein the machine learning model is a neural network.

5. The method of claim 1, wherein the machine learning model is a support vector machine.

6. The method of claim 1, wherein the machine learning model is a random forest ensemble classifier.

7. The method of claim 1, wherein the step of receiving the radar signal is performed by a receiver system that de-interleaves, measures parameters of, determines signal type and characteristics of, and determines location of a source of the received radar signal.

8. The method of claim 1, further comprising:
- representing the received signal with a pulse descriptor word that is a string of 1s and 0s, wherein the pulse descriptor word is composed of segments, each segment representing a parameter of the received radar signal.

9. The method of claim 1 further comprising: continually optimizing the new countermeasure technique during an electronic warfare engagement.

10. The method of claim 1, wherein the new, optimized countermeasure technique is an electronic attack meant to deny or degrade a radar's ability to detect and track an object, and wherein the radar is the source of the received radar signal.

11. The method of claim 1, further comprising taking frequency domain sampling of actual electronic warfare waveforms, varying the phase and amplitude parameters of each frequency sample, and generating electronic warfare waveforms to store in data library.

12. A system for generating countermeasure techniques to radar signals comprising:
- a receiver system configured to receive a radar signal;
- a processor comprising:
  - a data library configured to store parameters of known radar signals and a corresponding, pre-programmed countermeasure technique for each known radar signal,
  - a trained machine learning model operatively coupled to the data library and the receiver system, wherein the machine learning model is configured to make statistical correlations between the known radar signal parameters and the countermeasure techniques stored in the data library, and wherein the machine learning model is also configured to produce a new countermeasure technique for the received radar signal based on the received signal's parameters and the statistical correlations, and
  - an adaptive digital signal processing (DSP) system that is operatively coupled to the receiver system and the machine learning model, wherein the adaptive DSP system is configured to optimize the new countermeasure technique based on a real-time stream of signal data and also configured to store the received radar signal and the new, optimized countermeasure technique in the data library; and
- an electronic attack/electronic counter measure (EA/ECM) system configured to receive and implement the optimized new countermeasure technique from the adaptive DSP system.

* * * * *